United States Patent
Leff Yaffe et al.

(10) Patent No.: US 9,908,478 B2
(45) Date of Patent: Mar. 6, 2018

(54) INTEGRATED BICYCLE CARRIER FOR VEHICLE

(71) Applicant: FORD GLOBAL TECHNOLOGIES, LLC, Dearborn, MI (US)

(72) Inventors: Jonatan Leff Yaffe, Mexico City (MX); Carlos Emilio Merino, Benito Juarez (MX); Jorge Manuel Rodriguez Vazquez, Atizapan de Zaragoza (MX); Luis Manuel Garcia, Mexico D.F. (MX)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/921,856

(22) Filed: Oct. 23, 2015

(65) Prior Publication Data

US 2017/0113624 A1    Apr. 27, 2017

(51) Int. Cl.
*B60R 9/10* (2006.01)
*B60R 9/042* (2006.01)
*B60R 11/00* (2006.01)

(52) U.S. Cl.
CPC ............. *B60R 9/10* (2013.01); *B60R 9/042* (2013.01); *B60R 2011/0082* (2013.01)

(58) Field of Classification Search
CPC .... B60R 9/10; B60R 9/042; B60R 2011/0082
See application file for complete search history.

(56) References Cited

U.S. PATENT DOCUMENTS

| 6,889,880 | B2 |   | 5/2005 | Albaisa et al. |
| 7,159,931 | B2 | * | 1/2007 | Chernoff ............... B62D 25/06 |
|           |    |   |        | 224/321 |
| 2002/0088832 | A1 |  | 7/2002 | Anton |
| 2007/0090142 | A1 |  | 4/2007 | Chuang |
| 2014/0263513 | A1 |  | 9/2014 | Anton |

FOREIGN PATENT DOCUMENTS

| DE | 19715527 A1 |   | 11/1997 |
| DE | 19930004 A1 | * | 1/2001 ............ B60R 9/042 |
| DE | 102011121400 A1 | | 6/2013 |
| EP | 1227004 A1 |   | 7/2002 |

OTHER PUBLICATIONS

English machine translation of DE102011121400A1.
English machine translation of DE19715527A1.
English machine translation of EP1227004A1.

* cited by examiner

*Primary Examiner* — D Glenn Dayoan
*Assistant Examiner* — Melissa A Black
(74) *Attorney, Agent, or Firm* — Jason Rogers; King & Schickli PLLC

(57) ABSTRACT

A roof-mounted bicycle rack assembly for a motor vehicle includes a deployable bicycle carrier slidably attached to an underside of a roof panel of the motor vehicle. The bicycle carrier includes at least one bicycle support configured to deploy from and retract into a cooperating holder disposed on the roof panel underside. The bicycle support may include at least one tube or rail and the cooperating holder may include at least one sleeve or track configured to receive at least a portion of the at least one tube or rail therein.

12 Claims, 6 Drawing Sheets

INTEGRATED BICYCLE CARRIER FOR VEHICLE

TECHNICAL FIELD

This disclosure relates generally to accessory racks for motor vehicles, and more particularly to an integrated bicycle carrier system for a motor vehicle.

BACKGROUND

Conventionally, when a motor vehicle user desires to transport one or more bicycles her options are to place the bicycles in the vehicle interior, or to provide a suitable third-party bicycle carrier. Placing the bicycle in the vehicle interior risks soiling and/or damage to the vehicle and possibly the bicycle. In turn, because of space considerations the only way to place a bicycle in a vehicle interior space such as a cargo area is to at least partially disassemble the bicycle, for example by removing of one or both bicycle tires. This is inconvenient to the user.

A variety of suitable bicycle carrier or racks are available, including roof-mounted carriers, rear hatch or trunk-mounted carriers, vacuum-mounted carriers, and hitch-mounted carriers. Each is substantially effective for its intended purpose. However, roof-mounted and hitch-mounted carriers require that the vehicle be originally equipped or retrofitted with roof rails or a hitch box to which the carrier may be attached. Moreover, bicycles attached to roof-mounted carriers may create problems in areas where height restrictions apply, such as low tunnels, parking garages, etc. Rear hatch or trunk-mounted carriers and vacuum-mounted carriers must typically be removed when a bicycle is not being transported, and so risk damage to the vehicle paint and body parts. Therefore, a need is identified for a bicycle carrier for a vehicle that lacks these disadvantages.

To solve these and other problems, the present disclosure relates to a bicycle carrier assembly for a motor vehicle. Advantageously, the described carrier is integrated into and hidden within a roof structure of the vehicle when not deployed.

SUMMARY

In accordance with the purposes and benefits described herein, in one aspect a roof-mounted bicycle rack assembly for a motor vehicle is described, comprising a bicycle carrier slidably attached to an underside of a roof panel of the motor vehicle. The deployable bicycle carrier comprises at least one bicycle support configured to deploy from and retract into a cooperating holder disposed on the roof panel underside. The assembly further includes a pivoting panel for hiding the slidably attached bicycle carrier when disposed in a retracted configuration.

In embodiments, the bicycle support comprises at least one tube or rail and the cooperating holder comprises at least one sleeve or track configured to receive at least a portion of the at least one tube or rail therein. At least one stop may be provided, configured to prevent further sliding translation of the at least one bicycle support towards the deployed configuration or the retracted configuration.

In another aspect, a motor vehicle is provided having a body including a roof panel and a rear pivoting closure panel, and a deployable bicycle carrier as described above. A pivoting panel may be provided disposed at a top portion of the rear pivoting closure panel, the pivoting panel being configured to translate between an open configuration and a closed configuration for hiding the deployable bicycle carrier when retracted. In embodiments at least one motor may be provided, configured to deploy and retract the at least one bicycle support, and to translate the pivoting panel between and open and a closed configuration.

In the following description, there are shown and described embodiments of the disclosed integrated bicycle carrier assembly for a motor vehicle. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed integrated bicycle carrier assembly for a motor vehicle, and together with the description serve to explain certain principles thereof. In the drawing.

Reference will now be made in detail to embodiments of the disclosed integrated bicycle carrier assembly for a motor vehicle, examples of which are illustrated in the accompanying drawing figures.

DETAILED DESCRIPTION

Preliminarily, the disclosed integrated bicycle carrier assembly is described herein primarily in an embodiment associated with a motor vehicle including a rear cargo area having a closure provided by a rear liftgate, such as a sport-utility vehicle (SUV), a cross-over utility vehicle (CUV), and the like. However, it will be appreciated that the assembly is readily integrated into a roof panel of any suitable motor vehicle, and so the disclosure should not be taken as limiting in this respect.

Figure 1:
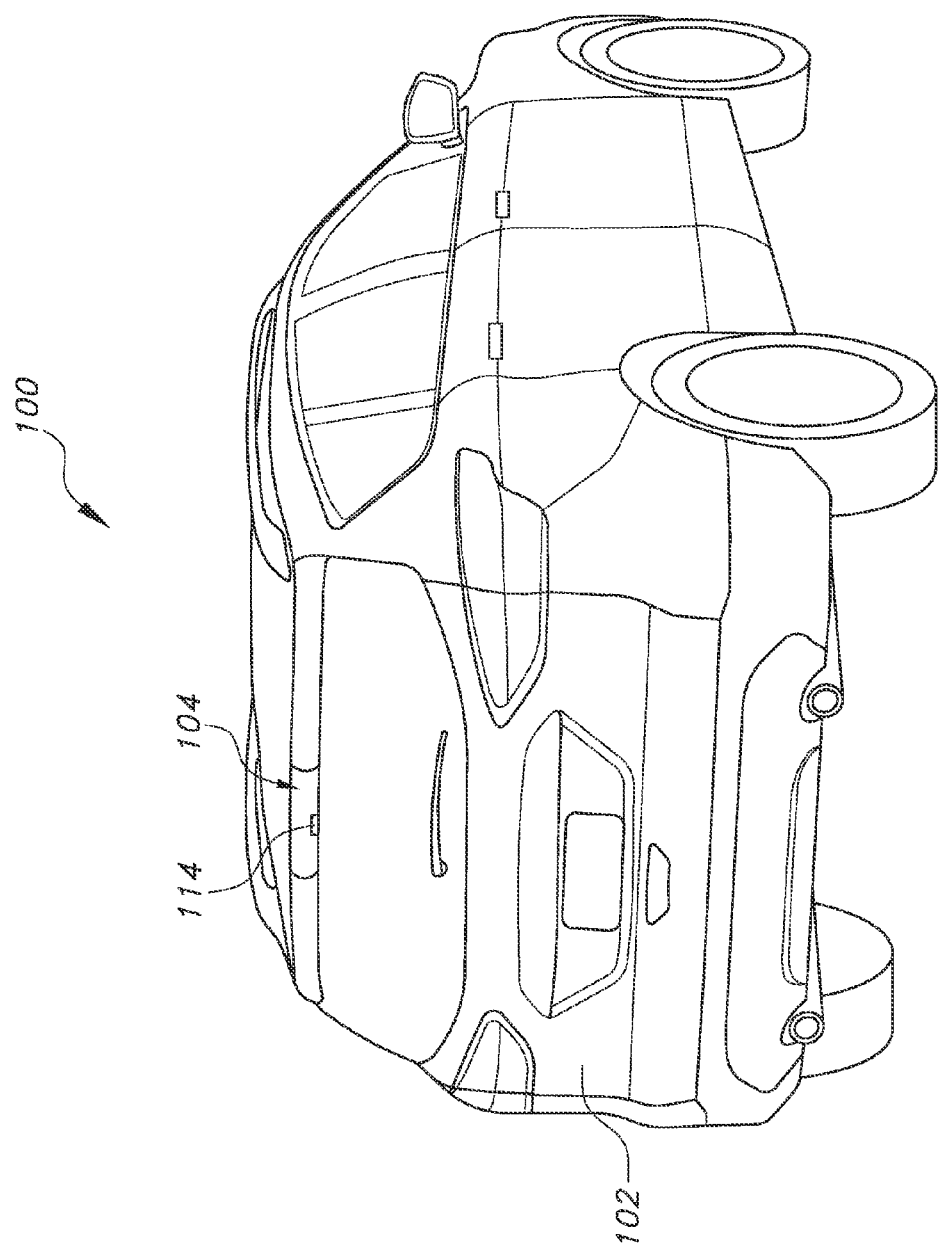
FIG. 1 depicts a rear perspective view of an integrated bicycle carrier assembly for a motor vehicle according to the present disclosure in a retracted configuration.
Figure 2A:
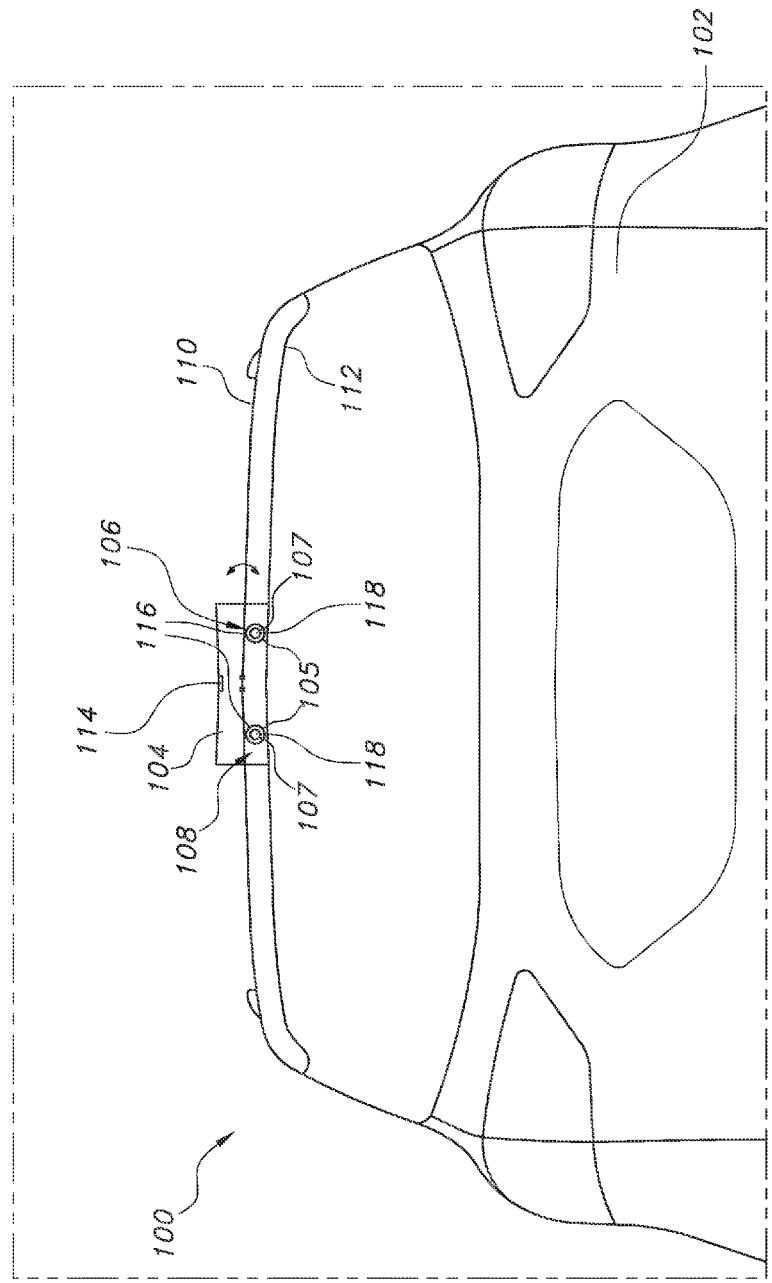
FIG. 2A depicts a rear view of an embodiment of the integrated bicycle carrier assembly of FIG. 1 in a retracted configuration.

With reference to FIG. 1, there is depicted a rear portion of a vehicle 100 including a closure provided by a liftgate 102. At a top portion of the liftgate 102, a pivoting panel 104 hides the disclosed bicycle carrier assembly 106 (not shown in this view). With reference to FIG. 2A, the bicycle carrier assembly 106 is disposed, when in a retracted configuration, in a cavity 108 (not shown in this view) defined by an underside of the vehicle roof panel 110 and a roof liner 112. The pivoting panel 104, when pivoted to a closed configuration as shown in FIG. 1, obscures the bicycle carrier assembly 106 from view. A locking/latching assembly 114 may be included to secure pivoting panel 104 in the closed configuration. A number of suitable locking/latching assemblies are known such as simple catches, push-pull locks, push-push locks, and others. Use of any such suitable locking/latching assembly 114 is contemplated. In alternative embodiments as will be described below, the entire system is motorized, and a user-actuated locking/latching assembly 114 is unnecessary.

The bicycle carrier assembly 106 includes at least one deployable bicycle support 105 configured to deploy from and retract into at least one cooperating holder 107 disposed on the roof panel 110 underside. In an embodiment the bicycle carrier assembly 106 comprises a pair of sleeves 116 attached to the underside of the vehicle roof panel 110. A pair of cooperating tubes 118 are slidably held by the sleeves 116 whereby the tubes may be deployed and retracted as will be described.

Figure 2B:
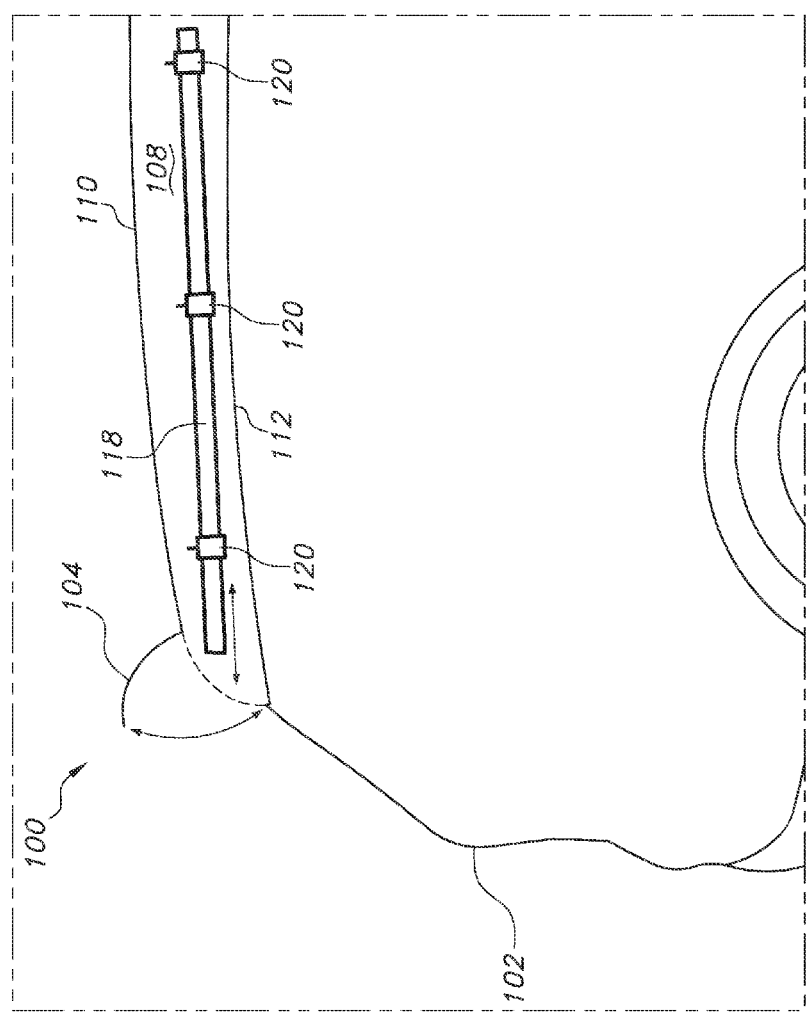
FIG. 2B depicts a side view of an alternative embodiment of the integrated bicycle carrier assembly of FIG. 2A in a retracted configuration.

In one alternative embodiment (see FIG. 2B), the cooperating tubes 118 are slidably held by a plurality of aligned holders 120 disposed in the cavity 108 for deployment and retraction (see arrow) through pivoting panel 104.

Figure 2C:
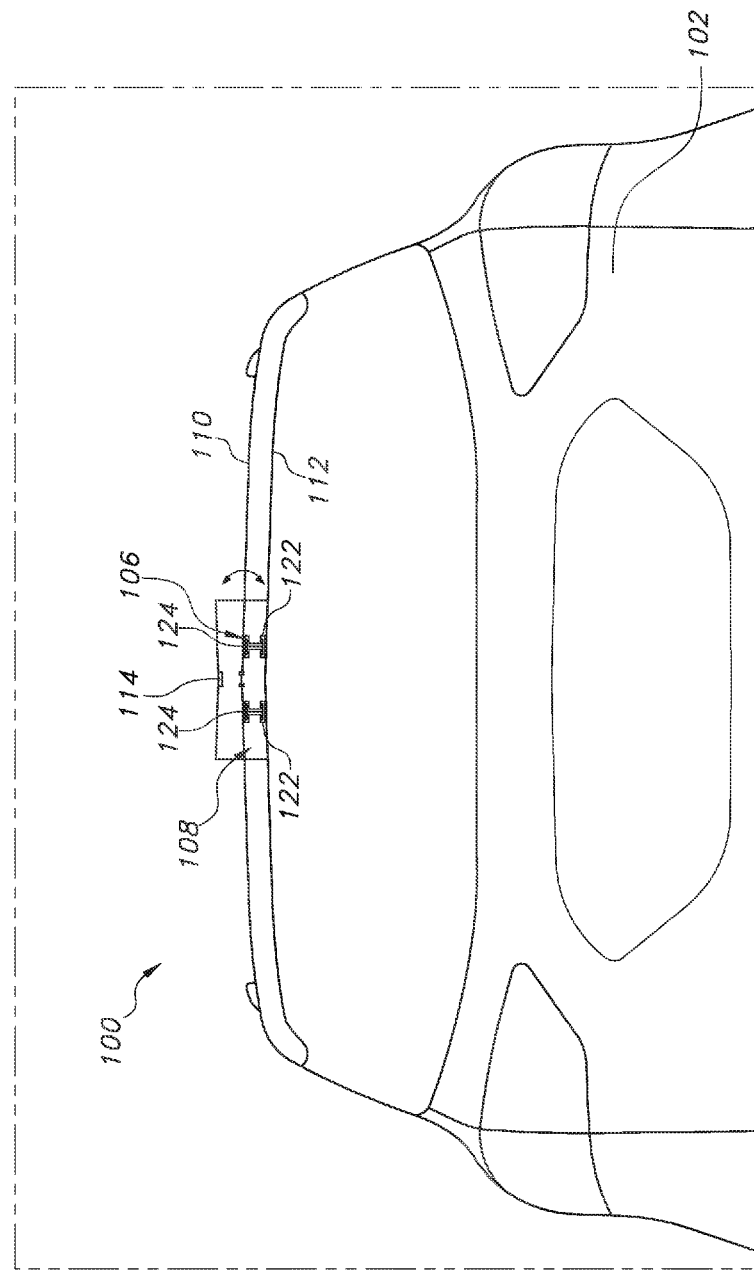
FIG. 2C depicts a rear view of another alternative embodiment of the integrated bicycle carrier assembly of FIG. 1 in a retracted configuration.

With reference to FIG. 2C, in another alternative embodiment the bicycle carrier assembly 106 comprises a pair of tracks 122 attached to an underside of the vehicle roof panel 110. A pair of cooperating rails 124 are slidably held by the tracks 122 whereby the rails 124 may be deployed and retracted.

Figure 3:
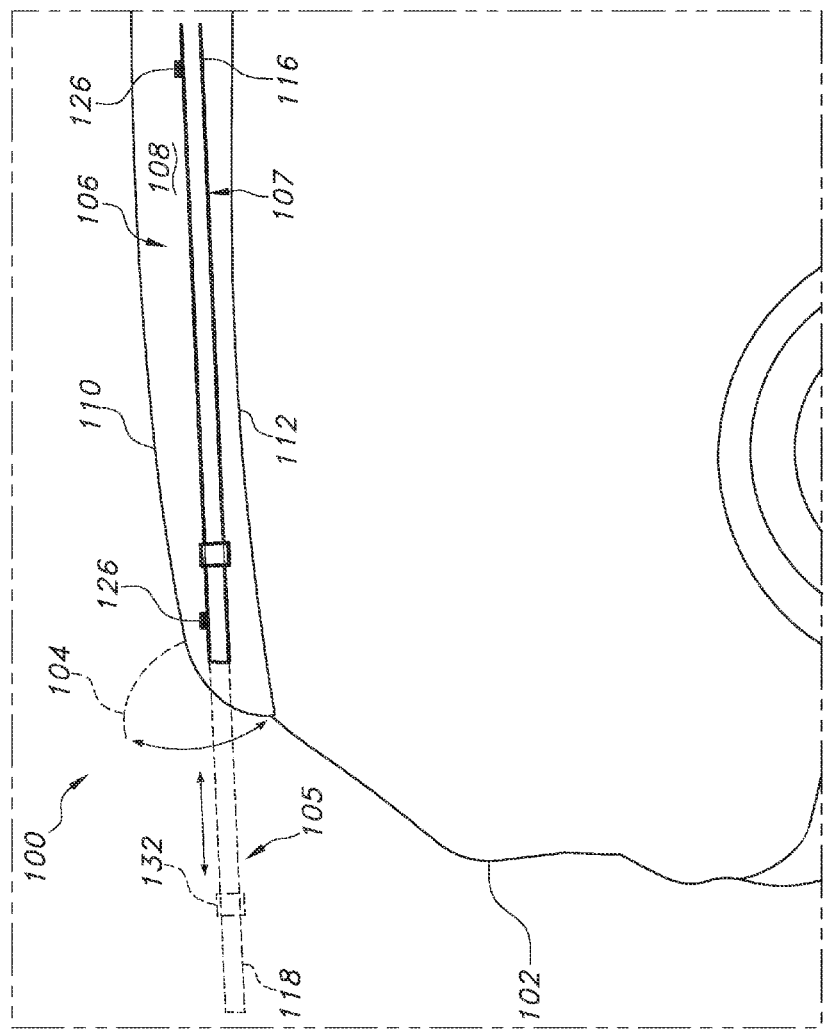
FIG. 3 depicts a side view of the integrated bicycle carrier assembly of FIG. 2A slidably translating into a deployed configuration.

Tubes 118/rails 124 may simply slidably translate respectively along sleeves 116/tracks 122. This is depicted in FIG. 3 showing tubes 118 slidably deploying from sleeves 116. Particular materials may be selected for fabrication of tubes 118, sleeves 116, rails 124, and/or tracks 122 which, by their inherent lubricity, provide a smooth sliding action between the cooperating tubes/sleeves and/or tracks/rails.

In alternative embodiments, the slidable translation may be effected by cooperating rollers, bearings, etc. associated with the sleeves 116 and/or the tracks 122 to ensure/improve smooth operation during deployment/retraction of the assembly 106. As one non-limiting example, roller bearings may be operatively associated with the sleeves 116 and/or the tracks 122, aligned to a sliding translation axis of the tubes 118 and/or rails 124, to reduce friction. Such mechanisms are well known to the skilled artisan, for example in the cabinetry and/or drawer slide arts, and do not require detailed description herein.

As is also known, stops and/or hold-in mechanisms 126 may be included, configured to retain the tubes 118/rails 124 in a deployed configuration and/or a retracted configuration as desired, and/or to prevent inadvertent full removal of the tubes 118/rails 124 from THE sleeves 116/tracks 122. As one non-limiting example, a mechanical lock may be provided comprising a removable pin positioned in a perpendicular orientation to a displacement axis of tubes 118/rails 124, which impedes sliding translation of the tubes 118/rails 124 beyond a desired point. Such mechanisms are also well known to the skilled artisan in the cabinetry and/or drawer slide arts, and do not require detailed description herein.

It is contemplated to provide any of the above-described embodiments configured for manual deployment of the integrated bicycle carrier assembly 106. As will be appreciated, this can be achieved by the simple expedient of opening pivoting panel 104, grasping a portion of the carrier assembly 106, and pulling to deploy the assembly. The assembly 106 would then be restored to the retracted configuration by the reverse process.

Figure 4:
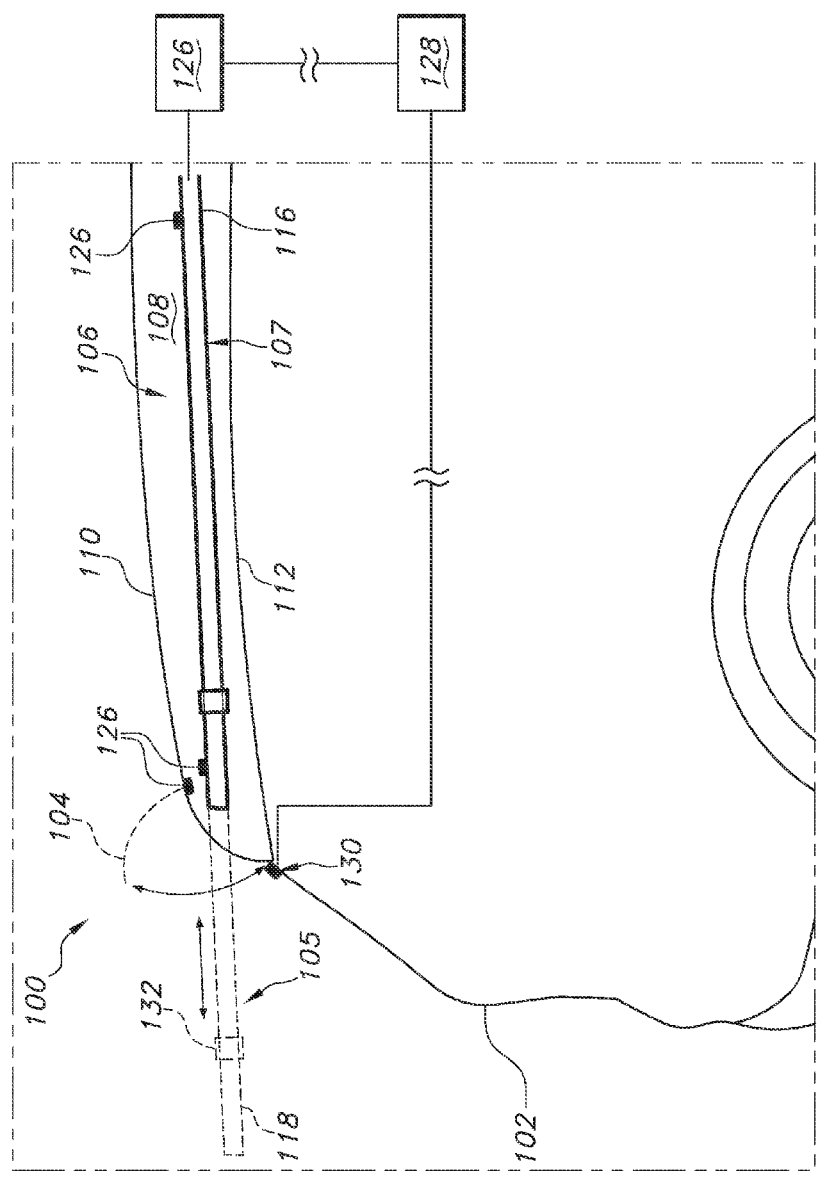
FIG. 4 depicts an alternative arrangement for deployment/retraction of an integrated bicycle carrier assembly according to the present disclosure.

In an alternative embodiment (see FIG. 4), control of the opening and closing of pivoting panel 104 and deployment/retraction of the integrated bicycle carrier assembly 106 may be placed under control of one or more motors 126. In turn, motors 126 may be under the control of a controller 128, such as the vehicle basic control module (BCM). A switch 130 may be provided for actuation of the motor(s) 126, disposed on one or more of the vehicle liftgate 102, on a vehicle instrument panel (not shown), on a key fob (not shown), on a smart key (not shown), or elsewhere. In this embodiment, the motors 126 which actuate deployment/retraction of the bicycle supports 105 may supplement or even replace the stops/hold-in mechanisms 126 to prevent deployment/retraction of the supports 105 beyond a desired point. As will be appreciated, any number of suitable motors for opening/closing pivoting panel 104, and for deploying/retracting the at least one bicycle support, are known in the art and contemplated for use herein. These include without intending any limitation rotating electric drive motors, linear actuators, and others.

Obvious modifications and variations are possible in light of the above teachings. For example, in accordance with the configuration, weight, and number of bicycles intended to be carried on the deployed bicycle carrier assembly 106, one, two, three, or more bicycle supports 105 and cooperating holders 107 may be included. In turn, one or more bicycle cradles 132 (see FIGS. 3 and 4) and associated straps (not shown) may be included on bicycle supports 105 for holding one or more bicycles (not shown). All such modifications and variations are within the scope of the appended claims when interpreted in accordance with the breadth to which they are fairly, legally and equitably entitled.

What is claimed:

1. A motor vehicle, comprising:
   a body including a roof panel and a rear pivoting closure panel;
   a deployable bicycle carrier slidably attached to an underside of the roof panel; and
   a pivoting panel disposed at a top portion of the rear pivoting closure panel, the pivoting panel being configured to translate between an open configuration and a closed configuration for hiding the retracted deployable bicycle carrier.

2. The motor vehicle of claim 1, wherein the bicycle carrier comprises at least one bicycle support configured to deploy from and retract into a cooperating holder disposed on the roof panel underside.

3. The motor vehicle of claim 1, wherein the bicycle support comprises at least one tube or rail.

4. The motor vehicle of claim 3, wherein the cooperating holder comprises at least one sleeve or track configured to receive at least a portion of the at least one tube or rail therein.

5. The motor vehicle of claim 4, further including at least one stop configured to prevent further sliding translation of the at least bicycle support towards the deployed configuration or the retracted configuration.

6. The motor vehicle of claim 2, further including at least one motor configured to deploy and retract the at least one bicycle support, and to translate the pivoting panel between and open and a closed configuration.

7. A motor vehicle having a deployable bicycle carrier, comprising:
   a body including at least a roof panel and a rear pivoting closure panel;
   a deployable bicycle carrier slidably attached to an underside of the roof panel; and a pivoting panel disposed at a top portion of the rear pivoting closure panel, the pivoting panel being configured to translate between an open configuration and a closed configuration for hiding the retracted deployable bicycle carrier.

8. The motor vehicle of claim 7, wherein the bicycle carrier comprises at least one bicycle support configured to deploy from and retract into a cooperating holder disposed on the roof panel underside.

9. The motor vehicle of claim 8, wherein the bicycle support comprises at least one tube or rail.

10. The motor vehicle of claim 9, wherein the cooperating holder comprises at least one sleeve or track configured to receive at least a portion of the at least one tube or rail therein.

11. The motor vehicle of claim 7, further including at least one stop configured to prevent further sliding translation of the at least bicycle support towards the deployed configuration or the retracted configuration.

12. The motor vehicle of claim 8, further including at least one motor configured to deploy and retract the at least one bicycle support, and to translate the pivoting panel between and open and a closed configuration.

\* \* \* \* \*